United States Patent
Deng et al.

(10) Patent No.: US 9,423,651 B2
(45) Date of Patent: Aug. 23, 2016

(54) BACKLIGHT MODULE AND DISPLAY DEVICE

(71) Applicants: BOE Technology Group Co., Ltd., Beijing (CN); Beijing BOE Display Technology Co., Ltd., Beijing (CN)

(72) Inventors: Yi Deng, Beijing (CN); Yanjun Sun, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 188 days.

(21) Appl. No.: 13/945,599

(22) Filed: Jul. 18, 2013

(65) Prior Publication Data

US 2015/0023004 A1  Jan. 22, 2015
US 2016/0209705 A9  Jul. 21, 2016

(30) Foreign Application Priority Data

Aug. 6, 2012  (CN) .......................... 2012 1 0284494

(51) Int. Cl.
G09F 13/08  (2006.01)
G02F 1/1335  (2006.01)
F21V 8/00  (2006.01)

(52) U.S. Cl.
CPC ........ *G02F 1/133603* (2013.01); *G02B 6/0011* (2013.01); *G02F 1/133606* (2013.01); *G02F 1/133608* (2013.01); *G02F 2203/62* (2013.01)

(58) Field of Classification Search
CPC .............................. F21K 9/50; G02F 1/133603

USPC ....................... 362/97.1, 97.3, 97.4, 632–634
See application file for complete search history.

(56) References Cited

U.S. PATENT DOCUMENTS

| 1,591,957 | A | * | 7/1926 | Berry | G02B 27/024 40/361 |
|---|---|---|---|---|---|
| 2,328,471 | A | * | 8/1943 | Leffel | 108/6 |
| 2,699,619 | A | | 1/1955 | Fink | |
| 4,470,214 | A | * | 9/1984 | Kinloch | G09F 21/04 40/365 |
| 4,733,485 | A | * | 3/1988 | Ozeki | G02B 27/024 362/97.4 |
| 5,383,138 | A | * | 1/1995 | Motoyama et al. | 361/679.27 |
| 5,795,227 | A | * | 8/1998 | Raviv et al. | 463/34 |
| 7,750,993 | B2 | * | 7/2010 | Kim | G02B 6/0066 345/102 |
| 8,289,685 | B2 | * | 10/2012 | Li et al. | 361/679.26 |
| 8,523,388 | B2 | * | 9/2013 | Wu | F21V 7/0016 362/240 |
| 2009/0086473 | A1 | * | 4/2009 | Tan | G02F 1/13318 345/102 |

FOREIGN PATENT DOCUMENTS

| CN | 101430054 A | 5/2009 |
|---|---|---|
| CN | 102313209 A | 1/2012 |
| WO | 2009060253 A1 | 5/2009 |

OTHER PUBLICATIONS

Extended European Search Report Issued by the European Patent Office on Nov. 29, 2013, for application No. 13179266.5, 11 pages.

(Continued)

*Primary Examiner* — Evan Dzierzynski
*Assistant Examiner* — Tsion Tumebo
(74) *Attorney, Agent, or Firm* — Ladas & Parry LLP

(57) ABSTRACT

A backlight module comprising a light source and a diffusion plate disposed immediately opposite a light exiting surface of the light source.

4 Claims, 6 Drawing Sheets

(56) References Cited

OTHER PUBLICATIONS

First Office action (Chinese language) issued by the State Intellectual Property Office ("SIPO") on Mar. 3, 2014 for priority Chinese application No. 201210284494.1, 5 pages.

English translation of first office action for application No. 201210284494.1, 4 pages.
English abstract of CN 102313209A, 2 pages.
English abstract of CN 101430054A, 1 page.
Abstract of WO 2009060253 A1, 2 pages.

* cited by examiner

BACKLIGHT MODULE AND DISPLAY DEVICE

CROSS REFERENCE TO RELATED APPLICATIONS

This application claims priority from Chinese National Application No. 201210284494.1, filed on Aug. 6, 2012, the contents of which are incorporated herein by reference.

BACKGROUND

Embodiments of the present invention relate to a backlight module and a display device.

In the present backlight display technology, a backlight module mainly comprises a light guide plate, a light source (such as a light emitting diode (LED)) opposite a light incident surface of the light guide plate, an optical film group opposite a light exiting surface of the light guide plate, a reflection plate reflecting back the light leaked from the light guide plate, and the like. The light emitted from the light source passes through the light incident surface of the light guide plate and enters the light guide plate, which guides the light to the optical film group in a relatively-uniform manner; a part of the light leaked from a back surface of the light guide plate is reflected by the reflection plate back to the light guide plate, and ultimately arrives at the optical film group. When coming into use, a liquid crystal panel of a display device is attached onto the light exiting surface of the optical film group. In need of taking consideration of stability and optical effect of the whole backlight module, the backlight module does not meet a user's increasingly higher requirement for portability of a product, because of its relatively-high cost, high thickness, and heavy weight.

SUMMARY

Embodiments of the present invention provide a backlight module and a display device comprising the backlight module, wherein the backlight module and the display device comprising the backlight module are characterized by less components, simple structures, low cost, and easy portability.

From one aspect, embodiments of the present invention provide a backlight module comprising a light source and a diffusion plate disposed immediately opposite a light exiting surface of the light source.

Alternatively, the backlight module further comprises a light source positioning groove, the light source disposed at a groove bottom of the light source positioning groove and the diffusion plate disposed at a groove opening of light source positioning groove.

Alternatively, the light source is a light emitting diode strip, a length direction of the light source being the same as a groove-length direction of the light source positioning groove.

From another aspect, embodiments of the present invention further provide a display device comprising a liquid crystal panel and the above-mentioned backlight module, a light incident surface of the liquid crystal panel is disposed opposite a light exiting surface of the diffusion plate, and a predetermined diffusion distance is between the light incident surface of the liquid crystal panel and the light exiting surface of the diffusion plate, a panel surface size of the liquid crystal panel is substantially equivalent to the size of a light-radiating region of the backlight module at the panel surface of the liquid crystal panel.

Alternatively, the backlight module is in a narrow strip shape, the backlight module further comprising a light source positioning groove having a length direction the same as a length direction of the backlight module, the light source disposed at the groove bottom of the light source positioning groove and the diffusion plate disposed at the groove opening of the light source positioning groove.

Alternatively, the display device further comprises two liquid crystal panel frames disposed on both sides of the liquid crystal panel extending along the length direction of the backlight module, wherein a supporting member is provided between each of the two liquid crystal panel frames and each of both sides of the light source positioning groove in a width direction, when the display device is in an expanded state.

Alternatively, the supporting member comprises a front plate and a back plate, a first end of the front plate pivotally connected to one side of the light source positioning groove in the width direction, and a second end opposite the first end of the front plate detachably supported on one side facing the backlight module of the liquid crystal panel frame; a first end of the back plate pivotally connected to the other side of the light source positioning groove in the width direction, and a second end opposite the first end of the back plate pivotally connected to one side facing the backlight module of the corresponding liquid crystal panel frame.

Alternatively, a distance between the two liquid crystal panel frames is less than that between the first end of the front plate and the second end of the front plate, and that between the first end of the back plate and the second end of the back plate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the present invention apparent, the technical solutions of the embodiment will be described in a clearly and fully understandable way in connection with the drawings related to the embodiments of the present invention. It is obvious that the described embodiments are just a part but not all of the embodiments of the present invention. Based on the described embodiments herein, those skilled in the art can obtain other embodiment(s), without any inventive work, which should be within the scope of the present invention.

Embodiments of the present invention will now be described in detail in connection with the drawings and embodiments.

Embodiment 1

Figure 1:
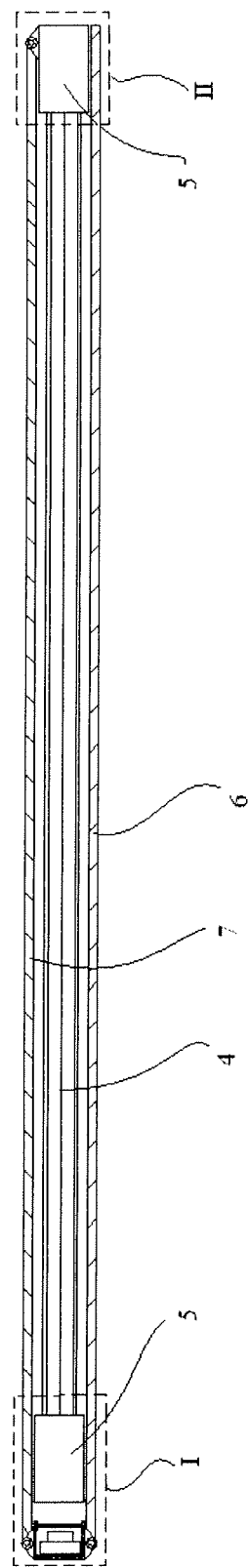
FIG. 1 is a side view of a display device in a folded state according to an embodiment of the present invention.
Figure 2:
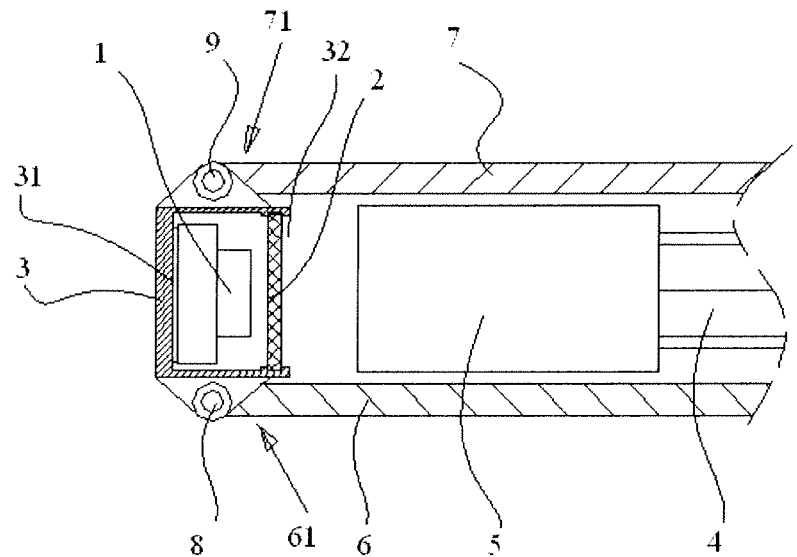
FIG. 2 is a partially enlarged perspective view of I in FIG. 1.
Figure 3:
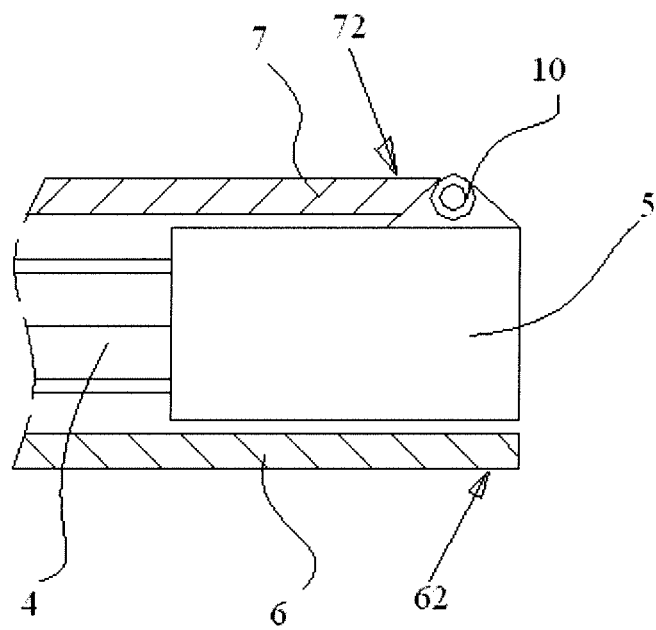
FIG. 3 is a partially enlarged perspective view of II in FIG. 1.
Figure 4:
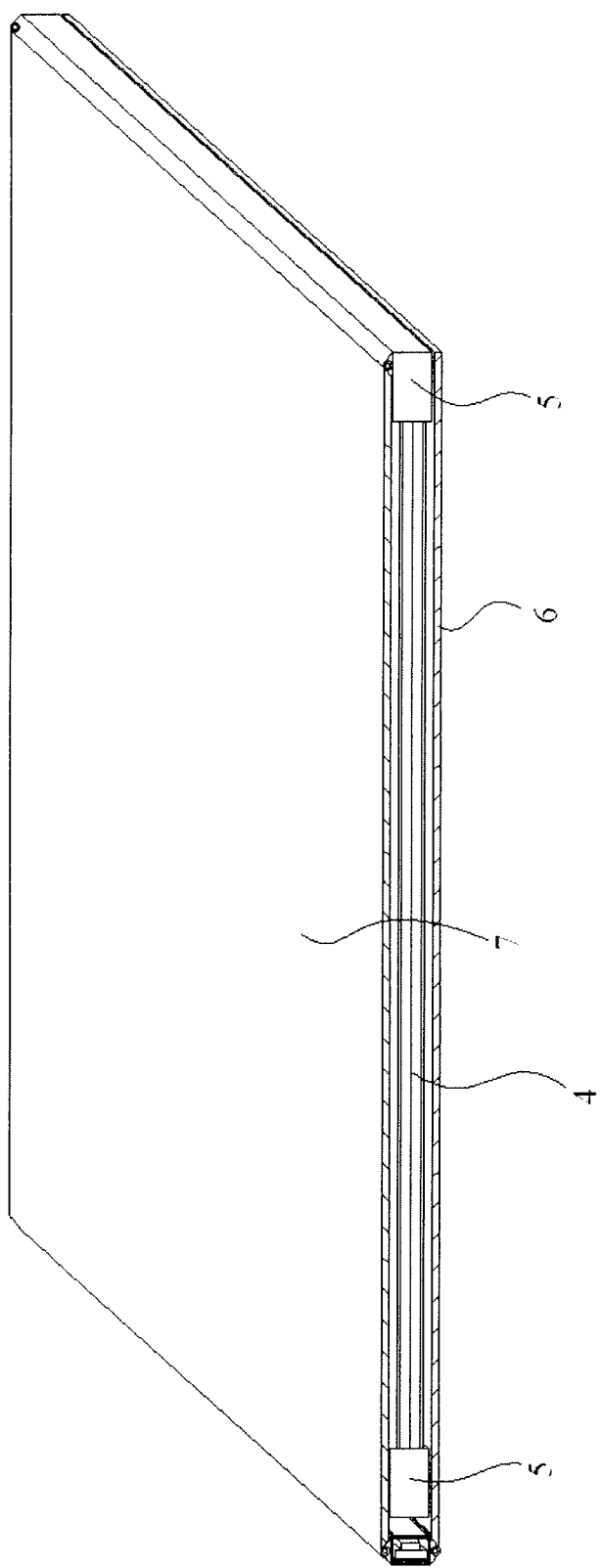
FIG. 4 is a schematic view of a three-dimensional structure of the display device in a folded state according to an embodiment of the present invention.

As shown in FIG. 2, this embodiment provides a backlight module comprising a light source 1 and a diffusion plate 2 disposed immediately opposite a light exiting surface of the light source 1. Herein, FIG. 2 shows an enlarged perspective view of an end portion I shown in FIG. 1 of a display device in a folded state according to an embodiment of the present invention.

In this embodiment, the light emitted from the light source 1 is irradiated on the diffusion plate 2, and then is uniformly diffused by the diffusion plate 2. It may serve as a backlight source of the display device due to its simple structure and low cost.

Figure 7:
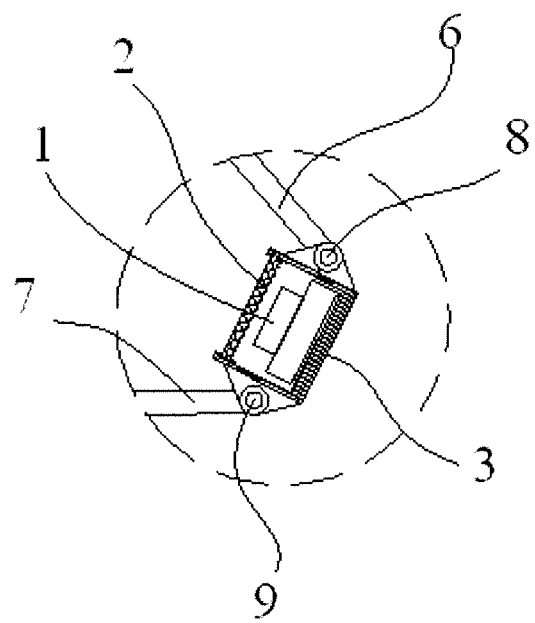
FIG. 7 is a partially enlarged perspective view of IV in FIG. 5.
Figure 8:
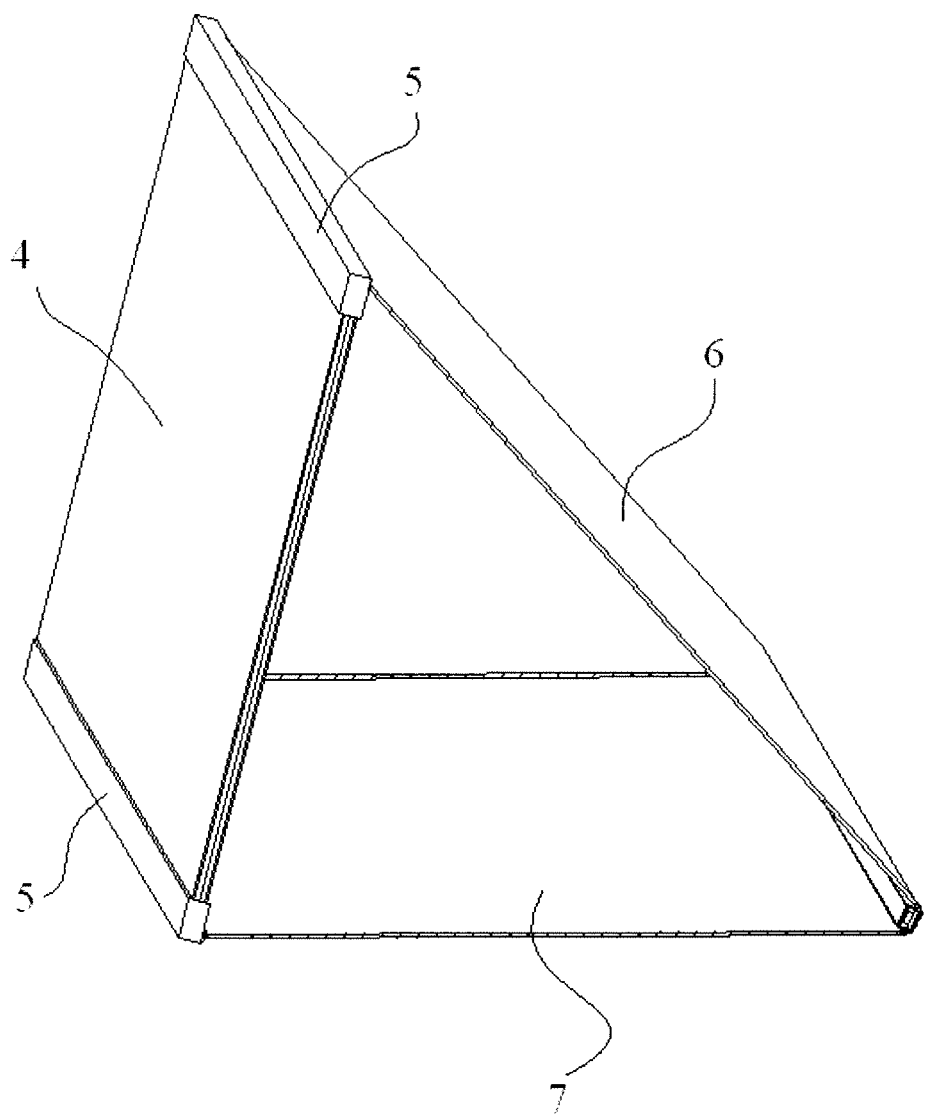
FIG. 8 is schematic view of a three-dimensional structure of a display device in an expanded state according to an embodiment of the present invention.

Alternatively, the backlight module further comprises a light source positioning groove 3, as shown in FIGS. 2 and 7, the light source 1 disposed at a groove bottom 31 of the light source positioning groove 3 and the diffusion plate 2 disposed at a groove opening 32 of the light source positioning groove 3.

In this embodiment, the light source 1 is a light emitting diode strip, a length direction of the light source 1 being the same as a groove-length direction of the light source positioning groove 3. Of course, the light source may also use any other suitable light source in the other embodiment of the present invention.

In this embodiment of the present invention, the light emitted from the light source is diffused merely by the diffusion plate to form a uniformly emitting backlight source, which has a simple structure and a low cost.

Embodiment 2

Figure 5:
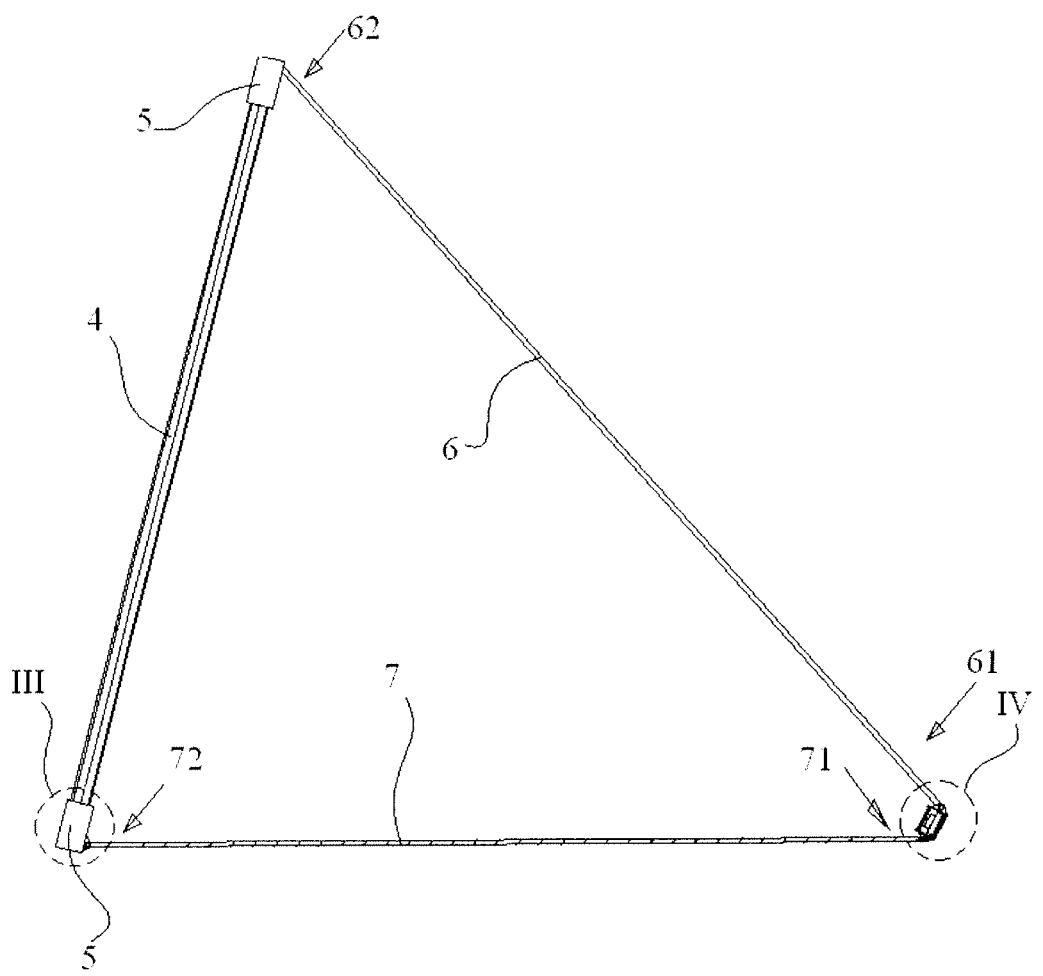
FIG. 5 is a side view of a display device in an expanded state according to an embodiment of the present invention.
Figure 6:
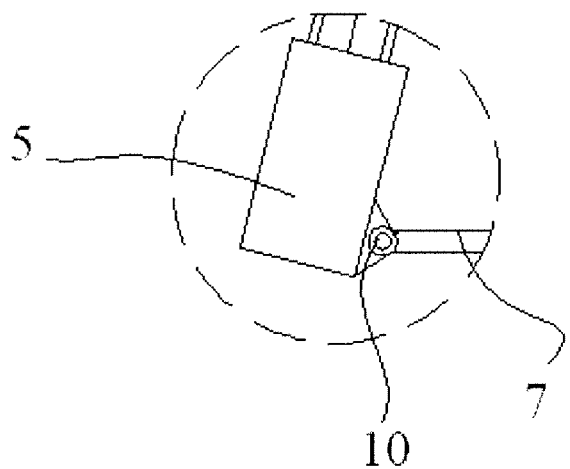
FIG. 6 is a partially enlarged perspective view of III in FIG. 5.

As shown in FIG. 5, this embodiment provides a display device comprising a liquid crystal panel 4 and the backlight module in the embodiment 1, wherein a light incident surface of the liquid crystal panel 4 is disposed opposite a light exiting surface of the diffusion plate and a predetermined diffusion distance is between the light incident surface of the liquid crystal panel 4 and the light exiting surface of the diffusion plate such that the light-radiating region of the light diffused by the diffusion plate can be up to a predetermined size at the predetermined diffusion distance and in turn a panel surface size of the liquid crystal panel 4 is substantially equivalent to the size of the light-radiating region of the backlight module at the panel surface of the liquid crystal panel 4. Herein, FIG. 5 shows a schematic view of the display device in an expanded state according to an embodiment of the present invention.

The diffusing light generated by the backlight module is uniformly irradiated on the surface of the liquid crystal panel 4, thereby the backlight module forming a relatively uniform and stable backlight source.

Alternatively, as shown in FIGS. 1-8, in this embodiment, the backlight module is in a narrow strip shape, the backlight module further comprising a light source positioning groove 3 having a length direction the same as a length direction of the backlight module, the light source 1 disposed at a groove bottom 31 of the light source positioning groove 3, and the diffusion plate 2 disposed at a groove opening 32 of the light source positioning groove 3. In the display device according to an embodiment of the present invention, a liquid crystal panel frame 5 is provided on each of both sides of the liquid crystal panel 4 extending along the length direction of the backlight module.

Alternatively, the display device according to an embodiment of the present invention further comprises a supporting member, wherein the supporting member is located between the two liquid crystal panel frames 5 and both sides of the light source positioning groove 3 along a width direction for supporting the liquid crystal panel 4, when the display device is in an expanded state.

Alternatively, in this embodiment, the light source positioning groove 3 is a groove body having a U-shaped cross section formed of the groove bottom 31 and groove walls on both sides of the groove bottom 31.

Herein, in this embodiment, the supporting member comprises a front plate 6 and a back plate 7, a first end 61 of the front plate pivotally connected to one side of the light source positioning groove 3 in the width direction, and a second end 62 of the surface opposite the first end 61 of the front plate detachably supported at one side facing the backlight module of the liquid crystal panel frame 5; a first end 71 of the back plate pivotally connected to the other side of the light source positioning groove 3 in the width direction, and a second end 72 of the surface opposite the first end 71 of the back plate pivotally connected to one side facing the backlight module of the corresponding liquid crystal panel frame 5. In this embodiment, pivotal connection between the front plate 6 and the light source positioning groove 3, between the back plate 7 and the light source positioning groove 3, and between the back plate 7 and the liquid crystal panel frame 5 is achieved by a first bearing 8, a second bearing 9, and a third bearing respectively. In other embodiment of the present invention, the above may be achieved by other structures.

In this embodiment, the front plate 6 and the back plate 7 are formed of aluminum materials.

The display device in this embodiment may be in a folded state as shown in FIGS. 1-4. The backlight module and the liquid crystal panel 4 are sandwiched between the front plate 6 and the back plate 7 for being protected. The display device is convenient for a user to carry and transport, because it has a small volume on the whole.

Alternatively, in the embodiment, a distance between the two liquid crystal panel frames 5 is less than that between the first end 61 of the front plate and the second end 62 of the front plate, and that between the first end 71 of the back plate and the second end 72 of the back plate, such that the front plate 6 and the back plate 7 may completely cover the liquid crystal panel 4 for comprehensive protection.

By making the liquid crystal panel 4, the front plate 6, the back plate 7, and the backlight module relatively rotatable via the first bearing 8, the second bearing 9, and the third bearing 10, the display device in this embodiment may be in an expanded state as shown in FIGS. 5-8. In the expanded state, the back plate 7 supports bottom portions of the liquid crystal panel 4 and the backlight module, the front plate 6 supports top portions of the liquid crystal panel 4 and the backlight module, and an angle, having a direction the same as the direction in which light is diffused by the diffusion plate, is formed between the front plate 6 and the back plate 7. The expanded liquid crystal panel 4 is erected and supported to some angle, which is convenient for a user to use. In this embodiment, the light source 1 of the backlight module is a LED strip; in use, the LED in the LED strip is lit, and a video signal is input into the liquid crystal panel 4; as a result, after being diffused by the diffusion plate, the light generated by the LED is uniformly projected onto the liquid crystal panel 4 so as to imaging.

In summary, the backlight module in an embodiments of the present invention has less components and a low cost; the uniformly diffused light from the backlight module is projected onto the surface of the liquid crystal panel, such that the whole display device has less components and a low cost; and the whole display device has characteristics of ultra-thinness and portability.

The aforementioned modes of carrying out the invention are merely used to explain the embodiments of the present invention, not limitative of the present invention. Those of ordinary skill in the relevant technical field may make various variations and modifications without departing from the spirit and scope of the present invention. Therefore, all of the equivalent technical solutions also belong to category of the present invention, and the protection scope of a patent for the present invention should be defined by claims.

The invention claimed is:

1. A display device, comprising:
   a liquid crystal panel; and
   the backlight module, comprising:
   a light source; and
   a diffusion plate, disposed directly opposite a light exiting surface of the light source,
   wherein, in an expanded state, a light incident surface of the liquid crystal panel is disposed opposite a light exiting surface of the diffusion plate, and a predetermined diffusion distance is between the light incident surface of the liquid crystal panel and the light exiting surface of the diffusion plate, a panel surface size of the liquid crystal panel is substantially equivalent to the size of a light-radiating region of the backlight module at the panel surface of the liquid crystal panel,
   wherein, in a folded state, the light exiting surface of the diffusion plate is disposed opposite one of both side-surfaces of the liquid crystal panel extending along a length direction of the backlight module,
   wherein the backlight module further comprising a light source positioning groove having a length direction the same as a length direction of the backlight module,
   the display device further comprises: two liquid crystal panel frames, disposed on both sides of the liquid crystal panel extending along the length direction of the backlight module; and a supporting member, wherein the supporting member is provided between each of the two liquid crystal panel frame and each of both sides of the light source positioning groove in a width direction of the light source positioning groove, when the display device is in an expanded state;
   wherein the supporting member comprises a front plate and a back plate,
   in the folded state, the backlight module and the liquid crystal panel are disposed between the front plate and the back plate, and
   a width of the backlight module is a same as a thickness of the liquid crystal panel.

2. The display device according to claim 1, wherein the backlight module is in a narrow strip shape, the light source disposed at a groove bottom of the light source positioning groove, and the diffusion plate disposed at a groove opening of the light source positioning groove.

3. The display device according to claim 2, wherein a first end of the front plate pivotally connected to one side of the light source positioning groove in the width direction, and a second end opposite the first end of the front plate detachably supported on one side facing the backlight module of one of the liquid crystal panel frames; a first end of the back plate pivotally connected to the other side of the light source positioning groove in the width direction, and a second end opposite the first end of the back plate pivotally connected to one side facing the backlight module of the other connected to the back plate of the liquid crystal panel frames.

4. The display device according to claim 3, wherein a distance between the two liquid crystal panel frames is less than that between the first end of the front plate and the second end of the front plate, and that between the first end of the back plate and the second end of the back plate.

\* \* \* \* \*